US008223940B2

(12) United States Patent
O'Shaughnessy et al.

(10) Patent No.: US 8,223,940 B2
(45) Date of Patent: Jul. 17, 2012

(54) SELECTING COMMUNICATION MODE OF COMMUNICATIONS APPARATUS

(75) Inventors: Kevin Michael O'Shaughnessy, Galway (IE); Ivo Ruben Willem Jager, Amstelveen (NL)

(73) Assignee: Hewlett-Packard Development Company, L.P., Houston, TX (US)

( * ) Notice: Subject to any disclaimer, the term of this patent is extended or adjusted under 35 U.S.C. 154(b) by 1111 days.

(21) Appl. No.: 12/114,156

(22) Filed: May 2, 2008

(65) Prior Publication Data
US 2009/0274286 A1 Nov. 5, 2009

(51) Int. Cl.
*H04M 3/42* (2006.01)
*H04M 11/00* (2006.01)
*H04M 1/00* (2006.01)
*H04B 1/38* (2006.01)

(52) U.S. Cl. ............. 379/201.02; 379/93.17; 379/93.23; 455/414.1; 455/556.2; 455/566

(58) Field of Classification Search ............. 379/201.01, 379/201.02, 201.12, 93.05, 93.17, 93.19, 379/93.23, 93.24; 455/414.1, 550.01, 556.1, 455/556.2, 566
See application file for complete search history.

(56) References Cited

U.S. PATENT DOCUMENTS

| 6,603,755 | B1 * | 8/2003 | Parker | 370/342 |
| 7,231,229 | B1 * | 6/2007 | Hawkins et al. | 455/564 |
| 2007/0035513 | A1 * | 2/2007 | Sherrard et al. | 345/157 |
| 2007/0250633 | A1 * | 10/2007 | Norby | 709/227 |

FOREIGN PATENT DOCUMENTS
JP 2005-217515 A 8/2005

OTHER PUBLICATIONS
International Search Report and Written Opinion, PCT Application No. PCT/US2009/039520, Nov. 23, 2009, 7 pages.

* cited by examiner

*Primary Examiner* — Harry Hong

(57) ABSTRACT

A communications device capable of communicating via any one of a number of communication modes comprises a mode comparator configured to determine which of the available modes is likely to be most appropriate for selection when initiating communication with a destination call party based at least in part on availability status data representative of a state of availability of the destination call party. The device displays the mode as a suggestion for selection by the user together with an ordered list of available communication modes for use in contacting a particular party, the list being ordered according to the likelihood of communication being successful. The call history for each mode in reaching the party is analyzed and a score calculated for each mode, the scores being relatively weighted according to a set of weighting factors arrived at from considering the current state of availability of the party, for example using presence information, and the inherent intrusiveness of each communication mode from the point of view of the called party.

20 Claims, 9 Drawing Sheets

SELECTING COMMUNICATION MODE OF COMMUNICATIONS APPARATUS

BACKGROUND

1. Field of Art

The present disclosure relates to communications apparatus and a method of operating communications apparatus, more specifically to mobile communications devices that are capable of communicating by one of a number of possible communication modes.

2. Description of Related Art

Communications devices are becoming increasingly sophisticated in their flexibility for providing different communication modes when connecting to a destination call party. Typically the communications device provides a user interface enabling the user to select whether to communicate with a destination call party via any one of a number of communication modes such as cellular wireless network, VOIP (Voice Over Internet Protocol) and UMA (Unregistered Mobile Access). Furthermore, the destination call party, which may either be an individual or an enterprise, may have a number of options for receiving communication via each mode. For example, an individual may have a work telephone number, a home telephone and a mobile telephone number and a SKYPE number. Each of these numbers is typically stored in the address book in the communications apparatus.

It is also known for communications availability status information to be made available to a communications device by such destination call parties, such information sometimes being referred to as presence information, and made available either by peer to peer communication or in a registry which acts as a server to push presence information to the communication device. The communications availability status may, for example, be that the destination call party is currently using his own communications device to make a mobile telephone call and therefore cannot receive another mobile telephone call, although he could receive a text message or email. Other situations are possible, for example, where the party enters a setting in their communications device to indicate that they are unavailable because they are attending a meeting or that they wish calls to be diverted to a different destination or different communications devices.

For the user who is contemplating making an outgoing call to contact the destination call party, and therefore, there is a proliferation of choice and a need to ensure that the user interface of his communications device is user friendly and configured to improve the likelihood that the user will make the best choice of communication mode for the outgoing communication. It may also be desirable for the user to have the option of the selection being made automatically by the communicator device.

Typically a communications device will have a processor in which a number of applications are capable of running, different applications being required for different modes of communication, such as an email application being required to send email and an instant messaging application being required to send instant messages. There will typically be an address book application by means of which the user can view via the display screen details of all the contacts with whom he is likely to communicate. A further application may also provide a directory service for locating contact information for entities providing services. When running any one of these applications, the user may decide to generate a communication to an entity which is identified by information displayed in the display screen of the user interface. The user must first choose which communication mode to use and then navigate to the user interface of the application for the selected mode of communication. Because presence information for a given mode is generally only accessible from the screen generated by the application for that mode, the user may experience trouble gaining an overview of the suitability of available modes of communication when deciding how to make an outgoing call.

SUMMARY

The disclosed embodiments include an example embodiment in which a communications device includes a mode comparator for determining which one of multiple available communication modes is likely to be most appropriate for selection when initiating communication with a destination call party. The determination is made based at least in part on availability status data that represents a state of availability of the destination call party.

In one embodiment, the mode comparator further generates an ordered list of the available communication modes for presentation to a user. The communication mode determined to be most appropriate is a first ranking mode of the communication list and the ranking of the communication modes in the list represents the likelihood of use of respective communication modes in communicating with the destination call party being successful.

In one embodiment, the communications apparatus includes a contact identifier module for extracting from currently viewed display data a contact identifier identifying the destination call party. The contact identifier module also obtains corresponding contact address information for use in each of the available communication modes. The communications apparatus also includes a historical data module for analyzing the history of previous communications using the contact address information. The historical data module also derives a score value for each communication representative of the number of instances of communication during at least one time period. The score value is provided as an input to the mode comparator for determining the ranking of the communication modes in the ordered list for presentation to the user.

In one embodiment, the mode comparator associates each of the available communication modes with a respective imposition value representing a degree to which communication with the destination call party via said communication mode is determined to be intrusive. From the availability status data, the mode comparator derives a presence value representing a degree to which the destination call party is determined to be receptive to intrusion using a comparable numerical range to that of the imposition values. The mode comparator also determines an availability based order of ranking of the communication modes from a correlation of the presence value and imposition values.

In one embodiment, the mode comparator determines a set of weighting factors for respective communication modes and multiplies the score value for each communication mode by its respective weighting factor to obtain weighted scores. The weighting factors are graded according to rank in the availability status based ranking order such that a first mode receives a maximum weighting factor and the remaining communication modes in order of rank receive progressively smaller weighting factors.

In one embodiment, the mode comparator determines the ordered list to be presented to the user by ranking the communication modes in order of the weighted scores. The first ranking mode in the ordered list for presentation has the highest weighted score.

In one embodiment, the mode comparator determines that the ordered list for presentation is the same as the availability based order of ranking if historical data is not available.

In one embodiment, the communications apparatus includes a display for displaying the ordered list to the user. The communications apparatus displays the first ranking mode in the ordered list as a suggested mode of communication. The communications apparatus further displays a presence indicator representative of the availability status data.

In one embodiment, the mode comparator is configured to correlate the presence value with imposition values by computing for each communication mode a distance between the presence value and imposition value. The mode comparator determines at least one mode in the availability status order of ranking on the basis of least distance and determines the order of ranking of remaining communication modes in the order of increasing imposition values.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

DETAILED DESCRIPTION

Figure 1:
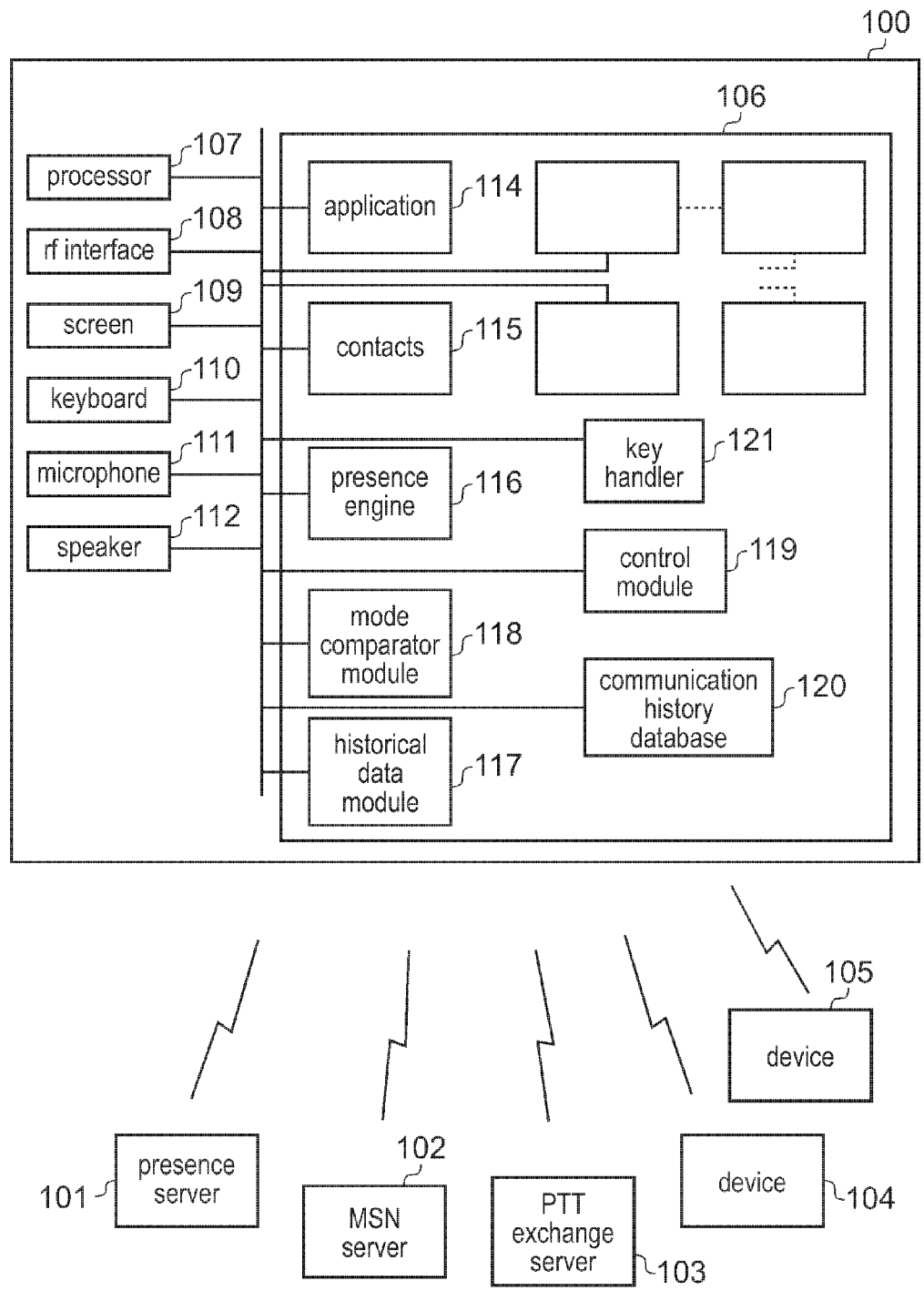
FIG. 1 is a block diagram illustrating a communications device according to one embodiment.

The embodiments described herein will be with reference to the accompanying drawings where feasible, like reference numerals are used for like elements in the accompanying drawings.

FIG. 1 illustrates a block diagram of a communications device 100, according to one embodiment. The communications device 100 is connected via network connection to a number of servers 101, 102 and 103 and to communication devices 104 and 105, one or both of which may be used by a destination call party.

The communications device 100 includes a computer memory 106, a processor 107, an RF (Radio Frequency) interface 108, a screen 109, a keyboard 110, a microphone 111 a speaker 112, and a data bus 113.

A number of communication application programs 114 are stored in computer memory 106. Respective contacts databases 115 of the communication application programs 114 store details of the contacts that are associated with the respective communications application programs. For example, a communications application program 14 corresponding to email mode of communication would include a contact database consisting of email addresses and contact identifiers.

Also in computer memory 106 is a presence engine 116 that is an application programming interface (API) configured to receive data representative of the communications availability status (i.e., presence) of the contacts of the user including the destination call party.

Also in memory 106 is a historical data module 117 that monitors usage of the device 100 and maintains a statistical log of use with reference to different communication modes and contacts over time. The historical data is stored in a communications history database 120.

Also in computer memory 106 is a mode comparator module 118 for comparing parameters associated with each of the available communication modes prior to initiating communication with a destination call party and for generating an ordered list for display on the screen 109 of the available communication modes. The list is ordered at least in part using presence information available via the presence engine 116.

A key handler 121 is a software module responding to keyboard 110 generated events. The key handler 121 provides appropriate inputs to the applications 114 and to a control module 119 that provides overall control of the processes leading to initiation of communication.

The device 100 communicates with a presence server 101 via a network. The presence server 101 is a server dedicated to processing availability status information. The presence server 101 includes a database that stores availability status information for a number of users registered with the server. The database also receives the availability information from respective communications devices, stores the information, and provides the availability status information to other users when instructed to do so by a user or changes in the communication availability status occur.

The device 100 also communicates with MSN (Microsoft Network) server 102 via a network. The MSN application is included in the communications application programs 114 of the device 100 to provide instant messaging mode of communication using the contact information stored in the databases 115 that is associated with the MSN application. Similarly, the device 100 communicates with PTT (push to talk) exchange server 103 over a network. The applications 114 include a corresponding communications application program to communicate with the PPT exchange server 103. The servers 102 and 104 are merely exemplary and other servers may also communicate with the device 100. Such servers are so called "communications cores" that provide at least a part of the communication functionality for the communications device 100. Additional servers may, for example, comprise a Yahoo server, a games server and a calendar server.

Communications devices 104 and 105 may be similar to the device 100 or may be variants or have different structure altogether. For example, communications devices may comprise personal computers, mobile telephones with limited functionality, more complex handheld devices with multi communication modes, or simple landline telephone handset. References to network communication above should be construed broadly to include other networks including the public service telephone network where appropriate, cable systems, wireless networks and the Internet.

Figure 2:
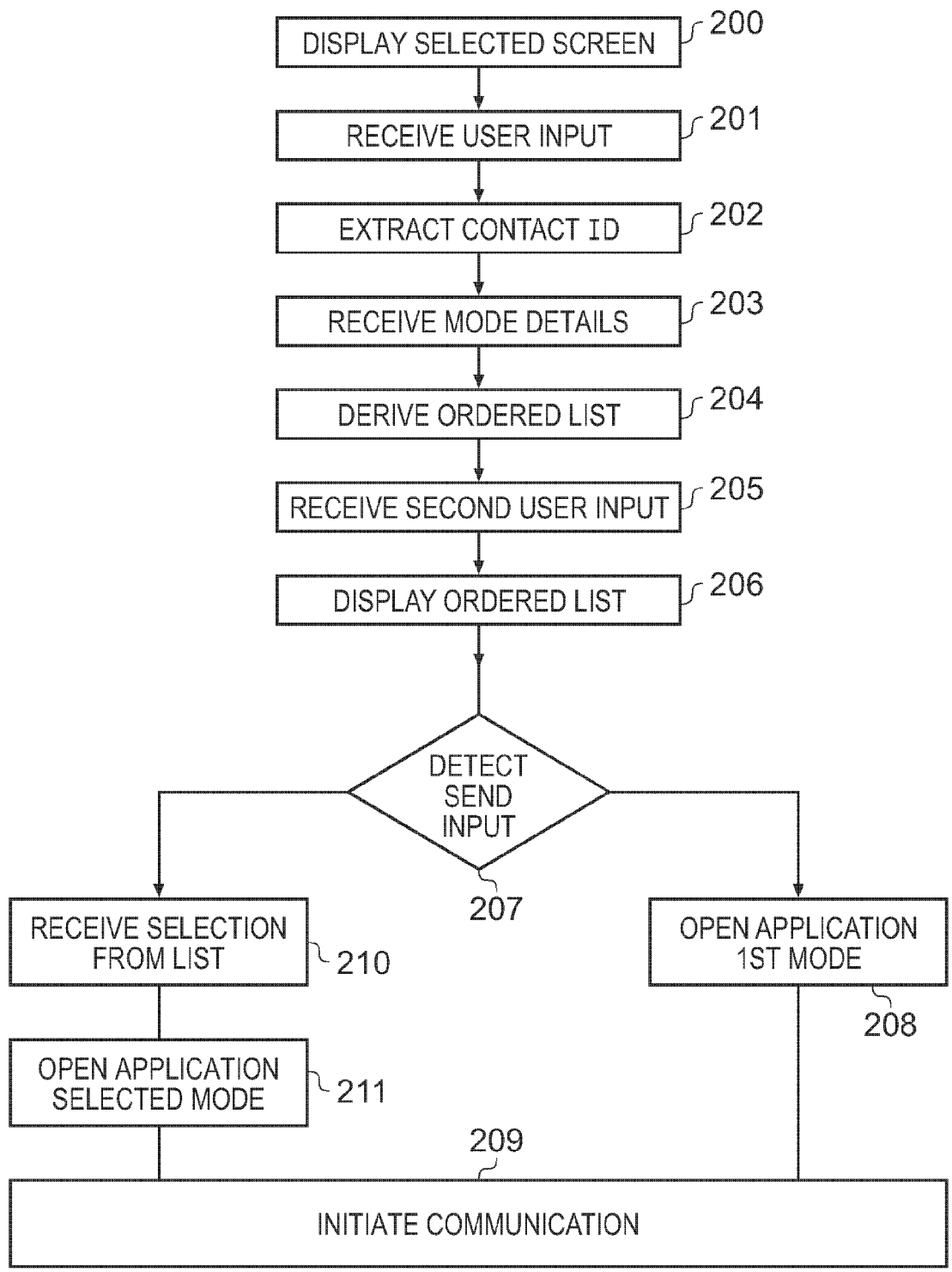
FIG. 2 is a flow chart illustrating initiating of communication with a destination call party, according to one embodiment.

FIG. 2 illustrates schematically the steps performed by the device 100 in order to initiate communication with a destination call party who may, for example, have access to a number of communications devices 104, 105 as shown schematically in FIG. 1 and can be reached via a number of different communications modes such as landline telephone, mobile telephone, SMS, facsimile, email, push to talk telephone communication, instant messaging, or any other available communications mode.

At step 200, the device 100 displays a selected screen by operating any one of a number of applications 114 such as an address book application in which contact details are provided for all of the contacts of the user. Another example is where the user has accessed via a browser application to an online directory where services are listed with contact details. Another example would be an email application in which the user is reading an email that includes contact details of a party which the user decides to contact.

At step 201, the device 100 receives a user input indicating the user's desired communication with a destination call party based on the information currently displayed in the screen. In this embodiment, the user input is detected by the key handler module 121 when the user presses a send key (often referred to as a green key) provided on the keyboard 110. This function may be carried out by the key handler 121 module of FIG. 1.

At step 202, the control module 119 extracts a contact ID (identifier) from the information currently displayed on the screen. The manner of extracting the contact ID depends upon the particular application currently generating the viewed screen. For example, if the application is an address book application and the screen is displaying a list of contacts, one of which has been given focus by the user, actuation of the send key is interpreted as selecting the focused entry. From the information displayed, the control module 119 translates the displayed information into a unique contact identifier held in a central repository of contact information.

The manner of extracting the displayed information may vary, for example, where a web page is displayed, the HTML source code may be parsed to identify from the tags in the HTML the textual description of the party to be called. This text may then be translated into the contact ID.

Also at step 200, the extracted contact ID is displayed to the user in the display screen so that the user can confirm that the correct contact has been selected.

At step 203, the control module 119 uses the contact ID to retrieve details of all known modes of communication which reference this contact ID. This requires polling each of the applications 114 to search their respective contacts databases 115. The communication mode details may, for example, include an email address, home telephone number, work telephone number, mobile telephone number, MSN address, PTT number, SKYPE number, and SMS number of pager number.

The mode comparator module 118 then proceeds at step 204 to derive an ordered list from the communication mode details. The ordered list describes at least a sub-set of the communication modes comprising all of the retrieved communication mode details, listing the order of the communication modes based on the likelihood that that communication with the call party destination will be successful. In obtaining the ordered list, the mode comparator module 118 accesses availability status data via the presence engine 116, or which is held by one or more of the applications 114, thereby taking into account the current availability status of the party to be called. In one embodiment, the mode comparator module 118 relies exclusively on the availability status information obtained in this way. In one embodiment, the mode comparator module 118 additionally makes use of information obtained from the historical data module 117. By using the information from the historical data module 117 the following, for example, may be taken into account: (i) whether communication via particular communication modes has been successful in the past, (ii) whether communication via a particular communication mode has taken place very recently with the party, and (iii) whether there are particular factors that adversely affects the efficiency of communication via particular communication modes.

The obtained ordered list is stored while the control module 119 awaits detection of a further input event. The input events may be pressing of the send key a second time by the user at step 205.

At step 206, responsive to receiving the second user input at step 205, the mode comparator module 118 processes to display a screen of available communication mode options as an ordered list. The display also indicates the identity of the destination call party corresponding to the extracted contact ID and the presence or availability status information for the destination call party where available.

In this way, the user becomes aware of the available communication modes for the given party, the "preferred" communication mode which appears at the top of the list, and the current status of availability (where such information is available).

The user then has two options: (i) accept the recommended mode of communication; and (ii) select a different communication mode from the list. If the first option is followed, the user simply presses the send key again. At step 207, the control module 119 via the key handler module 121 detects whether a further send instruction event has occurred, and if so, step 208 follows in which the communications application program 114 for the first communication mode in the list is opened and the contact ID is input to the application with an instruction to initiate communication.

Step 209 then follows in which communication via the selected communication mode is initiated.

If no send input is detected at step 207 and instead another communication mode is selected from the list (other than the first in the list), for example, by scrolling down and selecting a mode icon followed by pressing of the send key step 210. Then, in step 211, the communications application program 114 for the selected communication mode is activated. In step 209, communication is initiated using the activated application.

By the above embodiments, the user may simply select the party to be called from any screen, i.e., by using any application 114 currently available where screen displayed information can be used to extract a contact identifier. After selecting that a call be placed to the party, the user only needs to press the send key to receive the display of a suggested mode and an ordered list of modes. By simply re-pressing the send key, the user may initiate communication with the first item on the list as the selected communication mode. Alternatively, the user may make a different selection from the displayed list (for example, using a scroll functionality of the keyboard 110). By pressing the send key again, the user can initiate communication with the selected communication mode.

Figure 3:
FIG. 3 is an example of a screen generated by a mode comparator module of the communications device of FIG. 1.

FIG. 3 illustrates an example of a screen generated by the mode comparator module 118 for displaying the ordered list in step 206 of FIG. 2. In the example, the selected screen in step 200 was an inbox screen of an email application in which the name of an email sender, Monica, is given focus by the user manipulating the keyboard 110. Part of the screen generated by the email application is displayed in the upper portion 301 of the screen shown in FIG. 3. The lower portion 302 is overlaid by a user interface generated by the mode comparator module 118 and comprises a series of five icons 303, each of which represents a communication mode. These specific communication modes represented in this example, are from left to right as shown in FIG. 3, SMS messaging, email, MSN messenger, mobile telephone communication, and push to talk communication.

The first listed mode is SMS communication. In addition to making this item the first item in the list, the user interface also indicates by text "suggestion" to send Monica an SMS message. Availability status information is also included in the user interface in portion 302 by presence icon 304 which represents that the destination call party, Monica, is currently not available to talk by telephone.

Figure 4:
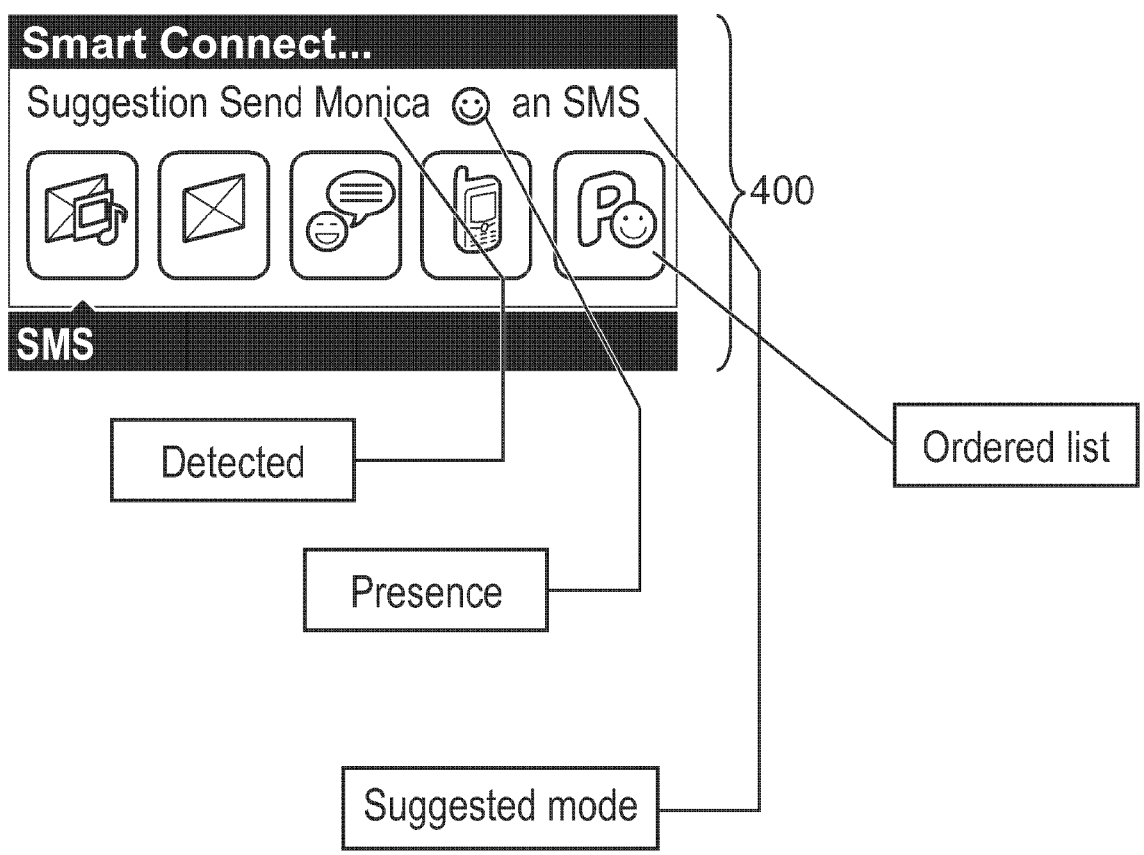
FIG. 4 is another example of a screen generated by the mode comparator module of FIG. 1.

FIG. 4 shows an alternative screen in which a single portion 400 of the display area contains the above icons representing the list and the suggested call communication mode. Such an option is preferable for devices with a smaller available screen size.

Figure 5:
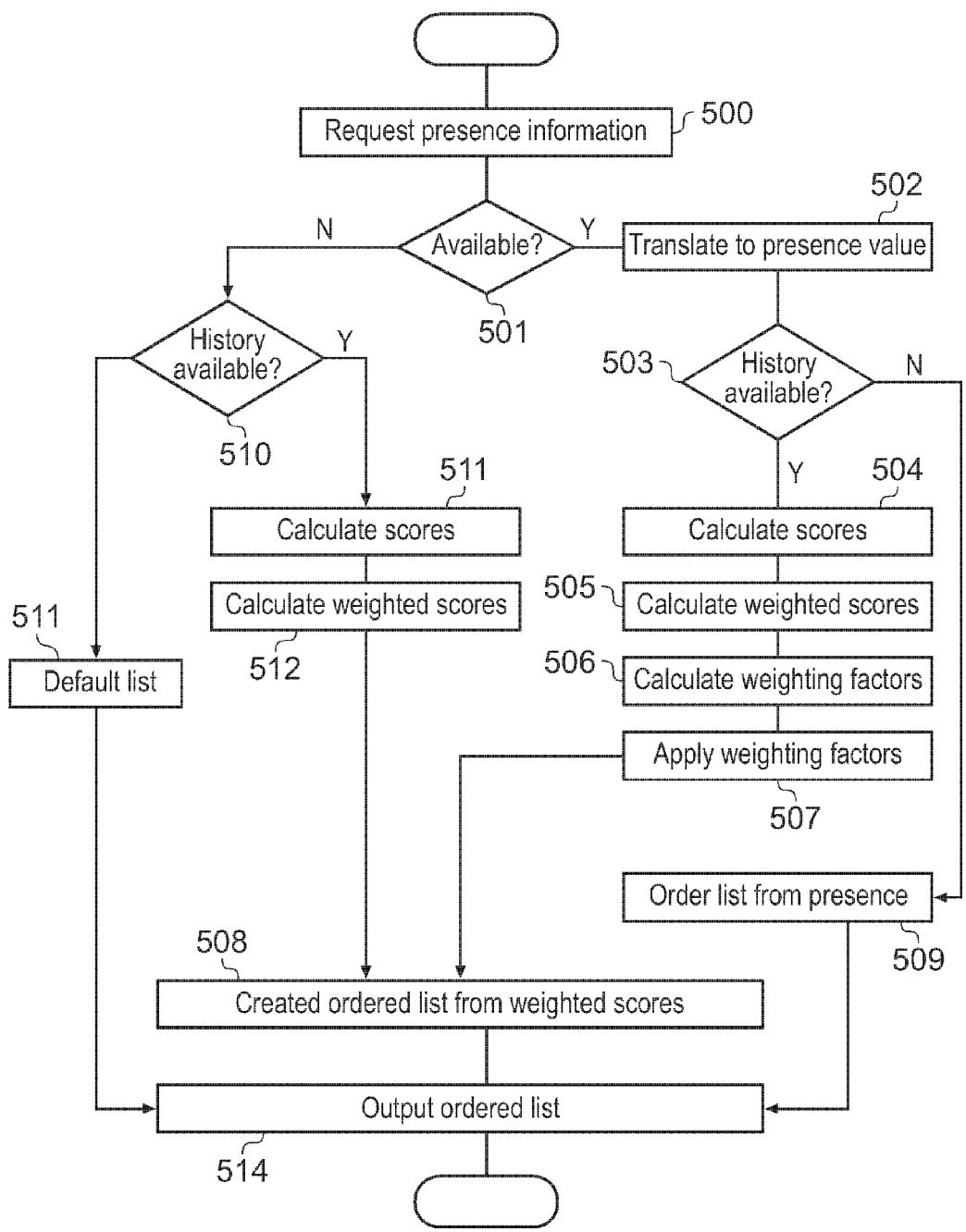
FIG. 5 is a flow chart illustrating generation of an ordered list of communication modes, according to one embodiment.

FIG. 5 illustrates schematically the process of step 204 in greater detail for deriving the suggested mode and the ordered list of communication modes.

At step 500, the mode comparator module 118 requests availability status information for the destination call party from the presence engine 116. The availability status information will typically be received in the form an identification of one of a number of possible states of availability. This availability status information is translated by a look-up table into a numerical presence value in the range 0 to 1, where 0 represents not available and 1 represents fully available. The intermediate values between 0 and 1 represent other states between the two states. If, for example, the destination call party is currently "on the telephone," the presence value may be 0.3.

This numerical presence value will be used in the subsequent calculation described below.

In FIG. 5, step 501 represents determining whether the availability status information is available. If the available status information is available, step 502 represents the translation step of translating the state into the numerical presence value.

Assuming that the availability status information is available, step 503 follows in which the mode comparator module 118 determines whether historical data is available from the historical data module 117. If available, the relevant call history is retrieved from the communications history database 120. At step 504 the mode comparator module 118 calculates for each of the communication modes a respective call history score. The purpose of calculating the score is to provide by projection an indicator of the probability that the destination call party will be available by a particular communication mode at a certain communication address at the current time, where the current time is taken from the timing of the event of receiving the user input instructing communication at step 201.

The call history is analyzed to determine for a number D of days of recent call history the number of times each mode was successfully used at a time of day defined by a window of N minutes before or after the current time T. The number of instances for a given mode of such call having been recorded is accumulated to provide a short term count for that mode.

The analysis is also carried out for a long term period of H days where H>>D to obtain a long term count for that mode (for example D=4 and H=30). The short term count and long term count are then combined, applying a relative weighting which may, for example, enhance the short term count, and the combined figure provides a composite score for each mode.

At step 505, the scores for the modes are weighted, firstly by determining whether a given mode corresponds to the currently viewed screen, i.e., is the current screen generated by the application used for that communication mode, and if so, the score in multiplied by a confidence multiplier S. In the present example, the value of S is 3. Therefore, if, for example, the currently viewed screen corresponds to an email application, then the communication mode of sending email will receive a weighted score by the factor of three (3) whereas the scores of the remaining modes will not receive this weighting.

Further weighting is applied in step 505 to take account of whether presence information directly associated with a particular communication mode is currently available by applying a multiplier E. This is based on the premise that, if the destination call party has entered presence information for a particular communication mode, this is an indication that the mode is preferred by that party.

Figure 6:
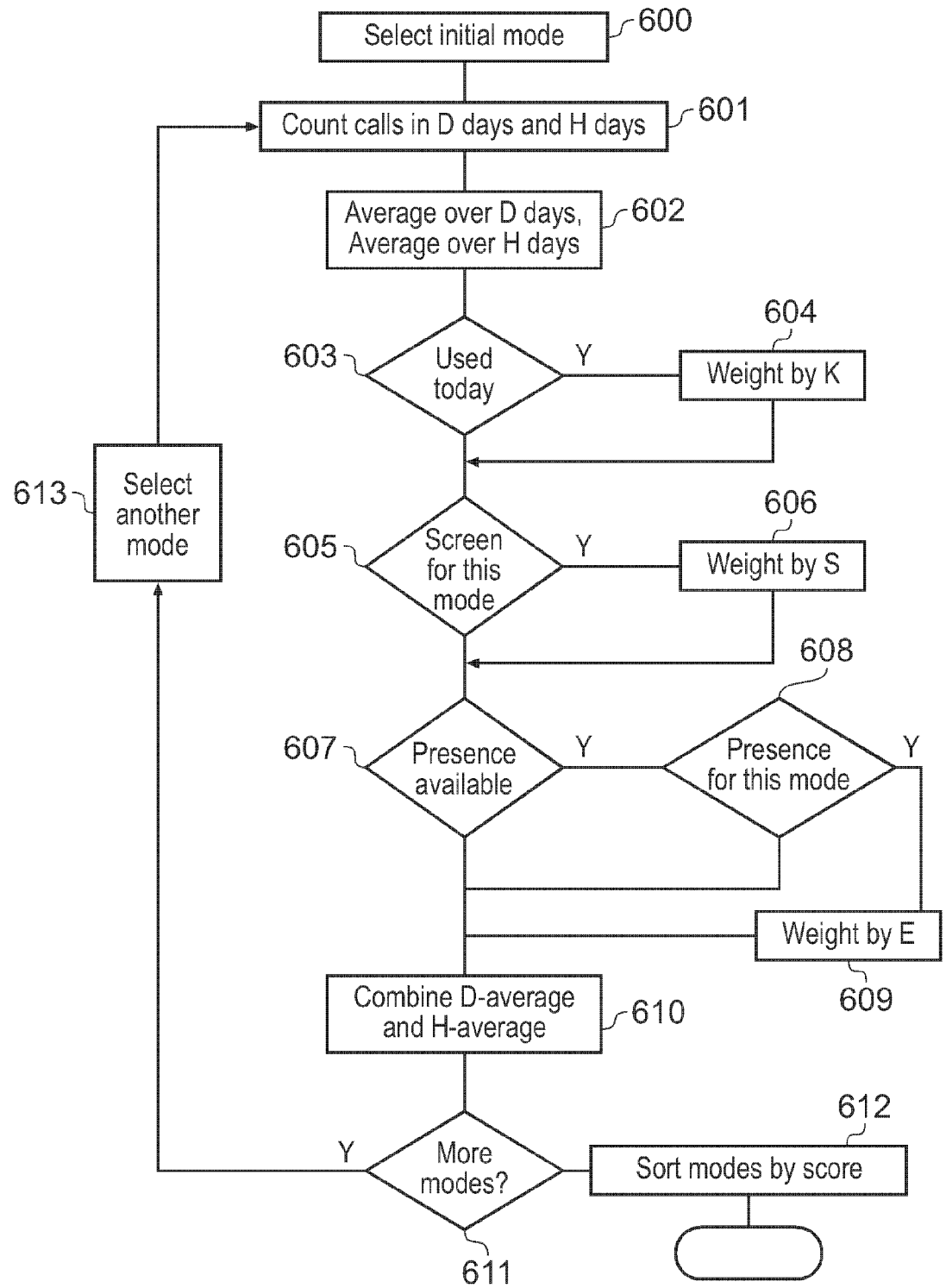
FIG. 6 is a flow chart of calculating weighted score according to one embodiment.

An example of an algorithm for generating weighted scores is included at Annex 1 and is also illustrated schematically in the diagram of FIG. 6.

At step 506, a set of weighting factors is determined in order to allow further weighting to be applied to the weighted scores produced by step 505 in order to take account of the relative suitability of different communication modes in making contact with the destination call party given the currently indicated availability status. Weighting factors are calculated for each mode so that those communication modes likely to be regarded as being intrusive and unwelcome given the current presence state of the destination call party are given a low weighting factor. By multiplying the current score for the communication mode with a low factor its effective score is weighted to be reduced relative to other communication modes. Conversely, those communication modes regarded as being non-intrusive, having regard to the current availability status information for the destination call party, will receive a higher value of weighting factor which when multiplied by the existing weighted score for the communication mode will increase the prominence of that communication mode relative to the other modes.

To facilitate calculation of the set of weighting factors, the notion of "imposition" on the called party is introduced to allow a numerical representation of the extent to which receiving a call via a particular communication mode is inherently intrusive. To represent "imposition," a predetermined imposition table is stored in memory. The table consists of tuples of communication mode and imposition value, each value consisting of a number between 0 and 1. An example is given in Table 1 below.

TABLE 1

| Mode | Imposition |
|---|---|
| Phone | 0.6 |
| Email | 0.15 |
| SMS | 0.4 |
| PTT | 1.0 |
| Instant Message | 0.2 |

As can be seen from the example of Table 1, communication modes having an inherently high level of intrusion on the called party such as push to talk where the called party must immediately respond, receive a high imposition value whereas the communication modes that have minimum intrusion such as SMS and email receive lower values because these messages can be accumulated and viewed when convenient and are not so intrusive to the parties receiving the communication while engaged in other activities.

The numerical values of imposition in Table are typically fixed numbers which are predetermined, either by an intuitive assessment of how intrusive each mode is, or as a result of empirical analysis. In an alternative embodiment, numerical values of imposition are progressively refined, either by using feedback from attempts at communication or by downloading better estimates of imposition value from a central server providing a monitoring service or from comments or other feedback received from the called parties.

The numerical presence value which is also in the range 0 to 1, may be compared with the entries in the imposition table to match the level of numerical presence value as closely as possible with the imposition value of one of the communication modes in the table. The premise here is that the imposition values are set at levels that will match the presence value if the communication mode is appropriate for the given availability status of the destination call party.

The first step in determining the weighting factors is to rank the communication modes in an availability based order in which they are considered to have a suitable imposition value in relation to the presence value. The most suitable communication mode, i.e., the highest ranking mode (rank=1) is determined by calculating the distance between the presence value and each of the imposition values in the table. Distance is defined as the modulus of the numerical difference between presence value and imposition value.

If the minimum distance is non zero, the most suitable mode is selected by considering only those modes having imposition values greater than the presence value and selecting from these the mode having an imposition value with least distance relative to the present value.

The next most suitable mode (rank=2) is then determined by considering only those modes having imposition values less than the presence value and selecting from these the mode having an imposition value with least distance relative to the presence value.

The remaining communication modes are ranked in order of ascending imposition values.

Figure 7A:
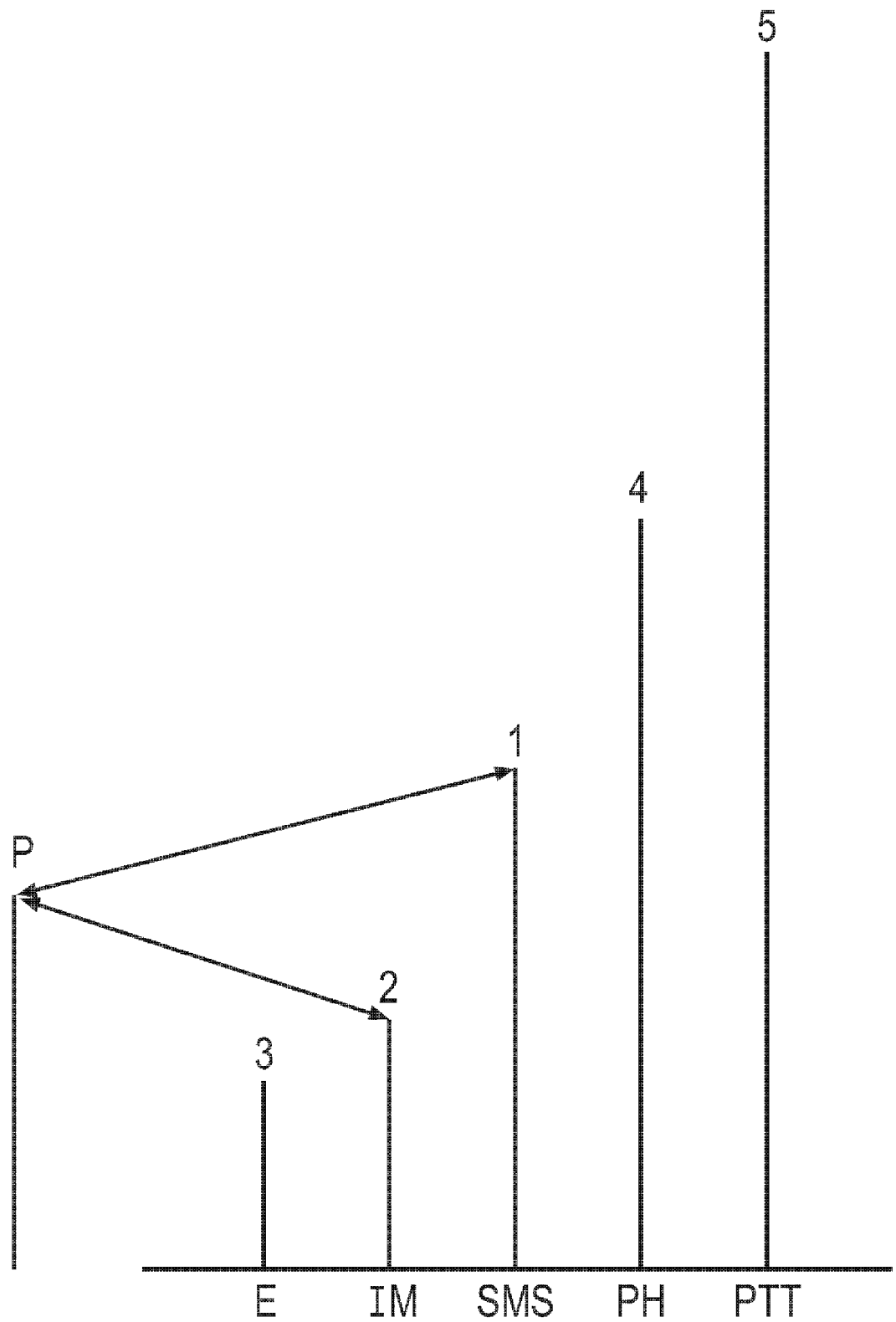
FIG. 7A is a graph illustrating the correlation between a presence value and imposition values, according to one embodiment.

Comparing a presence value of 0.3 with the imposition values in this way provides the rank information indicated in Table 2 and shown graphically in FIG. 7A in which SMS ranks first in the ordered list, instant messaging (IM) second, email (E) third, telephone (PH) fourth and push to talk (PTT) fifth, in this example. (In FIG. 7A, numbers 1 to 5 indicate rank.)

TABLE 2

| Mode | Imposition | Rank | Weighting Factor |
|---|---|---|---|
| Phone | 0.6 | 4 | 1.1 |
| Email | 0.15 | 3 | 1.3 |
| SMS | 0.4 | 1 | 2.0 |
| PTT | 1.0 | 5 | 1.0 |
| Instant Message | 0.2 | 2 | 1.6 |

If, however, the presence value is identical to one of the imposition values in the table (i.e., distance is zero), then the mode having this imposition value is selected as the most suitable mode (rank=1). The next most suitable mode (rank=2) is selected by considering only those modes having imposition values greater than the presence value and selecting from these the mode having an imposition value with least distance relative to the presence value. The next most suitable mode (rank=3) is then determined by considering only those modes having imposition values less than the presence value and selecting from these the mode having an imposition value with least distance relative to the presence value. The remaining communication modes are ranked in order of ascending imposition values. This process is illustrated graphically in the example of FIG. 7B for presence value=0.4.

The ranking in the availability based order of communication modes is now converted to weighting factors as indicated, for example, in presence value=0.3 in Table 2. The weighting factors are numerical values linearly related to the availability based ranking of the communication mode so that the top ranking communication mode, SMS, receives a factor of 2.0 (maximum factor) whereas the fifth ranking communication mode, push to talk, receives the minimum factor which is 1.0.

At step 507, the weighting factors are applied as further weighting to the weighted scores obtained from step 505. In the present example, consider a set of scores as shown in Table 3.

TABLE 3

| Mode | Score |
|---|---|
| Phone | 2.3 |
| Email | 3.0 |
| SMS | 2.0 |
| PTT | 1.6 |
| Instant Message | 0.7 |

Each value of score in Table 3 is multiplied by the weighting factor for each respective mode obtained from Table 2 to obtain imposition weighted scores.

The imposition weighted scores are indicated in Table 4 together with the resulting final ranking for presentation to the user obtained by listing the communication

TABLE 4

| Mode | Imposition weighted score | Final ranking |
|---|---|---|
| Phone | 1.1 * 2.3 = 2.53 | $3^{rd}$ |
| Email | 1.3 * 3.0 = 3.9 | $2^{nd}$ |
| SMS | 2.0 * 2.0 = 4 | $1^{st}$ |
| PTT | 1.0 * 1.6 = 1.6 | $4^{th}$ |
| Instant Message | 1.6 * 0.7 = 1.12 | $5^{th}$ | modes as an ordered list in order of imposition weighted score, represented in step 508 of FIG. 5.

Figure 8:
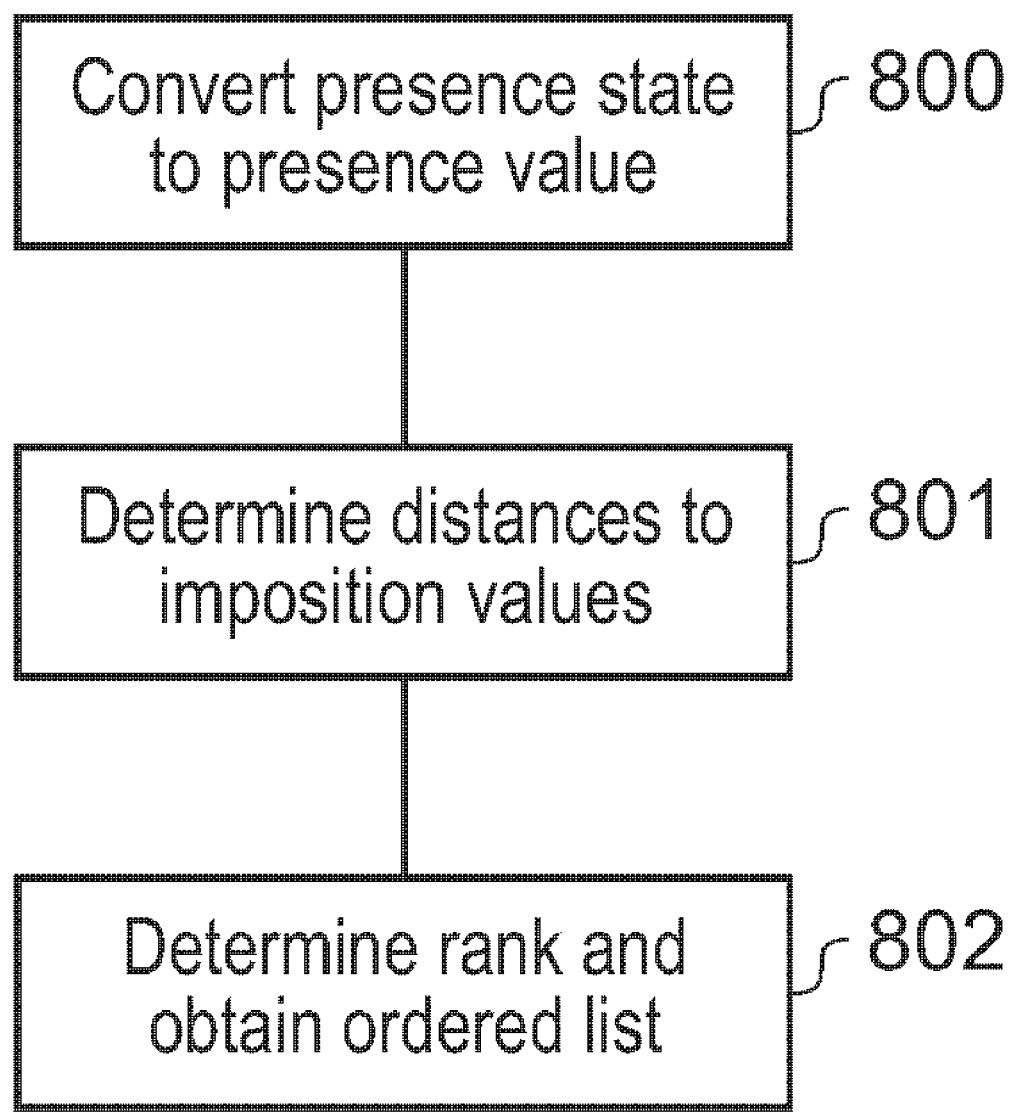
FIG. 8 is a flow chart for determining the ordered list in the absence of historical data, according to one embodiment.

If, at step 501, it is determined that the availability status presence information is available but that at step 503 it is determined that no call history is available, for example because the communications device 100 is new or because no communication has taken place within recent history, step 509 follows in which the ordered list is taken to be the same as the availability based order of modes calculated above. FIG. 8 illustrates schematically how this is done. Step 800 corresponds to step 502 in which the availability status information in the form of state data is converted by a look-table into a presence value in the range 0 to 1. At step 801, the mode comparator module 118 compares the presence value with imposition values for each of the available communication modes and determines for each mode a distance. The distance is defined as the modulus numerical difference between the numerical presence value and the imposition value.

Figure 7B:
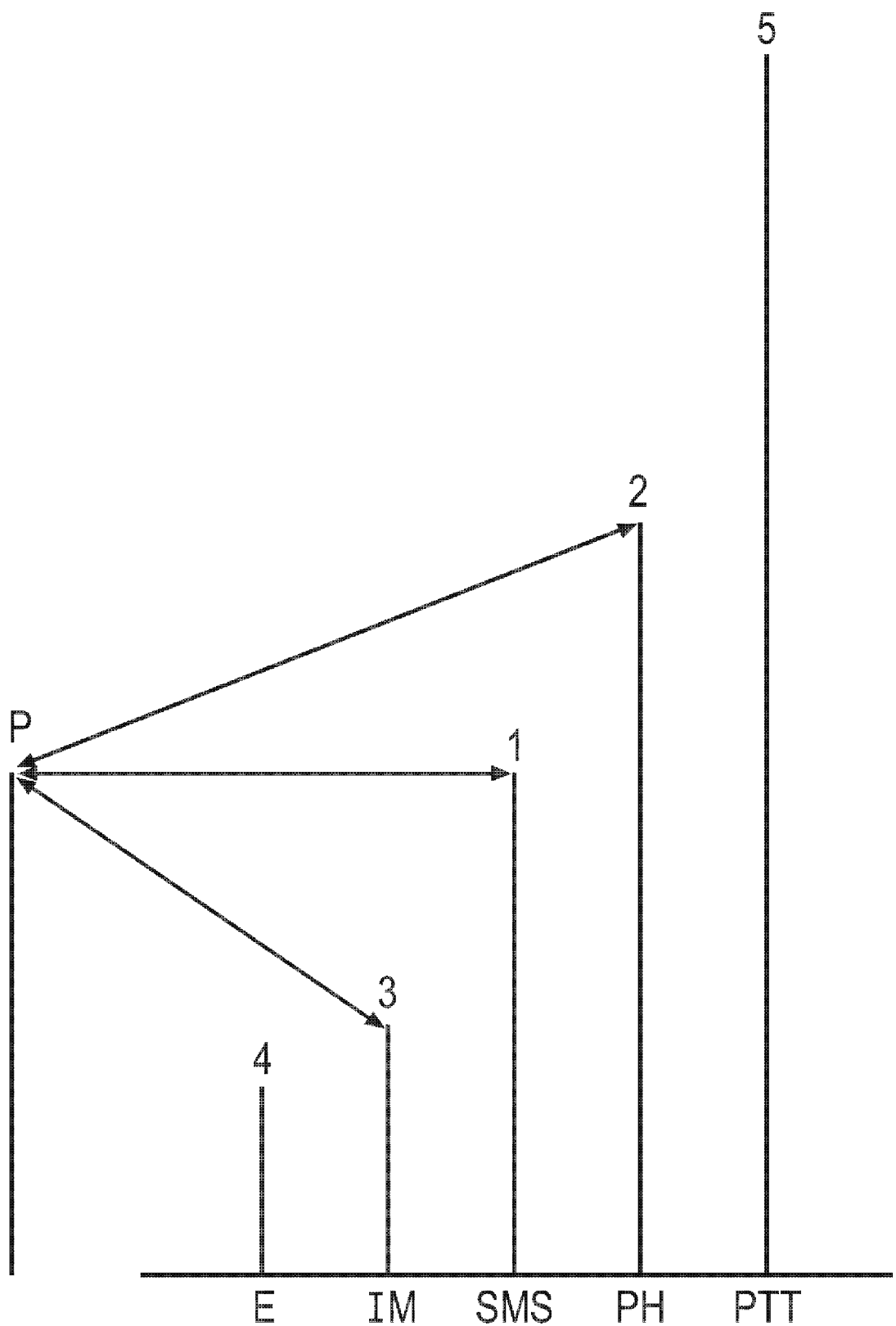
FIG. 7B is a graph illustrating the correlation between a presence value and imposition values when one of the imposition values is identical to the presence value, according to one embodiment.

At step 802, the communication modes are ranked in an order considered to have a suitable imposition value in relation to the presence value using the procedure outlined with reference to step 506 and as shown in FIGS. 7A and 7B.

In this way the availability based ordered list at step 802 is derived, thereby completing the step of 509 in FIG. 5.

If at step 501 it is determined that availability status information is not available, step 510 follows in which it is determined whether call history is available. If it is available, step 511 follows in which call history scores are calculated in the same way as described above with reference to step 504.

Weighted scores are then calculated at step 512 using the method outlined at step 505, with the exception that there is no input of availability status information to add presence weighting.

Having obtained the weighted scores, the list of communication modes is ordered according to weighted score at step 508 and is then ready for presentation to the user.

If at step 510 it is determined that no call history is available, in the absence of availability status information, a default list is determined at step 513. This may, for example, make the assumption that the currently displayed screen indicates the communication to be recommended and the remaining communication modes are listed in order of ascending imposition value, i.e., those communication modes such as email with a low level of intrusion are listed with a higher rank than those communication mode with a high level of intrusion such as push to talk.

At step 514, the ordered list obtained by any of the preceding methods is output and stored ready for display when required by the control module 119.

FIG. 6 illustrates in flow chart form the algorithm at Appendix 1 for score calculation.

At step 600, an initial mode is selected and at step 601 the call history data is analyzed for that particular selected mode to determine within a window of ±N minutes from the current time how many calls were made using the mode, covering a number of days specified by variable D. For example, D may be four days.

At step 602, this count is divided by D to give a short term average number of calls per day.

A simple process finds a count for a larger period of H days and a long term average number of calls per day is calculated. H may, for example, be 30 days.

At step 603, it is determined whether the communication mode has been used today, i.e. on the same day as the current time, and if so, step 604 multiplies each of the averages by a scalar K to thereby apply a weighting for recent communication having occurred. For example, K may be 2.0.

Step 605 then follows in which it is determined whether the currently viewed screen is associated with the application program for using the communication mode currently being considered. If this is the case, step 606 multiplies the averages by a further confidence multiplier S. For example, S may be 3.0.

At step 607, it is determined whether the availability status information is available for the contact party. If the answer is yes, step 608 determines whether this availability status information relates specifically to the communication mode currently being considered. If this is true, step 609 applies a further weighting E. For example, E may be 3.0.

Step 610 combines the two averages obtained for short term and long term history. In the preferred embodiment, a simple average of these two figures is obtained. In alternative embodiments, either short term or long term history can be given preferential weighting by applying an appropriate multiplication factor.

Step 611 then determines whether there are further modes to be processed and if so the next mode is selected at step 613 and the process recommences from 601.

When step 611 detects that all modes have been processed, step 612 processes the accumulated weighted scores for the set of communication modes and sorts the modes by order of score in an ordered list for presentation to the user.

As described above, the send key, often referred to as a green key, on the keypad is utilized to initiate the selection of communication mode, thereby requiring modification to the normal function associated with such a key. In an alternative embodiment, a different dedicated key may be provided for the functionality of mode selection.

The facility of providing mode selection and an ordered list of communication modes is in the above preferred embodiment continuously available as a functionality of the device 100. In an alternative embodiment, this functionality may be turned on or off according to user preference, for example, using a settings menu of the device.

A predetermined set of imposition values is associated with each of the communication modes. In an alternative embodiment, the imposition values are updated over time to take account of observations or call history analysis regarding the relative success of each mode of communication in achieving successful communication, or the reaction of the typical called party to such communication. The dynamic updating of the imposition values may be performed by software within the device, for example, or may be performed externally and downloaded to the device as a set of new operating parameters.

In the above described embodiments, the ordered list of communication modes is represented to the user as a series of icons. Alternatively, a text description of each communication code may be provided. The list of communication modes may be a complete list which, if necessary, requires scrolling by the user to view the entire list. Alternatively, only a predetermined number of communication modes in the list are selected for display to take account of the limited display size of the screen.

In the above described embodiments, a suggested communication mode is indicated to the user in the display screen and the user has the option of selecting the suggested communication mode or selecting one of the remaining communication modes from the ordered list. In an alternative embodiment, the communications device is configured to always call the destination call party using the suggested communication mode and without presenting the list to the user as an alternative for selection.

In the above described embodiments, the ordered list and preferred communication mode are determined by computation prior to second actuation of the user input key, or send key, whereas in an alternative embodiment, computation is not commenced until after such second actuation or user input.

In the above described embodiments, call history data is stored in a central repository or communication history database 120. In an alternative embodiment, instead of using such a database, each individual application has a respective storage area for maintaining call (i.e. communication) history information which is then retrieved when required for analysis.

In a further embodiment, the mode comparator may additionally take account of availability status information for the user of the communication device 100 so that, for example, the user may indicate his availability status to preclude verbal communication, thereby making it desirable for other communication modes such as SMS or MSN to be used.

A further embodiment may combine availability status for more than one source, for example, where different applications have associated therewith respect availability status information.

In the above described embodiments, the suggested communication mode and ordered list are presented to the user by display screen. Other forms of presentation are possible in alternative embodiments, for example, other forms of visual display such as presentation using sound, for example, using speech synthesis software to generate a spoken output presented via the loud speaker of the device.

The preferred embodiment has been described with reference to a communications device which might typically be a hand-held wireless device for use with a cellular telecommunications network. Other forms of device are envisaged in accordance with the present disclosure, provided that they are capable of communicating via more than one mode, and may comprise a personal computer having network connectivity, or any other processor based device, capable of running a plurality of communications applications.

It will be appreciated that any of the examples of different availability status options discussed above can be used with this embodiment, and that any of the optional features of any of the embodiments described herein could also be provided with one or more of any of the other embodiments described herein.

As noted in some of the embodiments above, they may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. The embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values or symbols arranged in a predetermined syntax, that when executed, may cause a processor to perform a corresponding set of operations.

The software may be written or coded using a programming language. Examples of programming languages may include C, C++, BASIC, Perl, Matlab, Pascal, Visual BASIC, JAVA, ActiveX, assembly language, machine code, and so forth. The software may be stored using any type of computer-readable media or machine-readable media. Furthermore, the software may be stored on the media as source code or object code. The software may also be stored on the media as compressed and/or encrypted data. Examples of software may include any software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. The embodiments are not limited in this context.

Some embodiments may be implemented, for example, using any computer-readable media, machine-readable media, or article capable of storing software. The media or article may include any suitable type of memory unit, memory device, memory article, memory medium, storage device, storage article, storage medium and/or storage unit, such as any of the examples described with reference to a memory. The media or article may comprise memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), subscriber identify module, tape, cassette, or the like. The instructions may include any suitable type of code, such as source code, object code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, JAVA, ActiveX, assembly language, machine code, and so forth. The embodiments are not limited in this context.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or viewing devices. The embodiments are not limited in this context.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, use of the "a" or "an" are employed to describe elements and components of embodiments of the present disclosure. This was done merely for convenience and to give a general sense of the embodiments of the present disclosure.

This description should be read to include one or at least one and the singular also includes the plural unless it is obvious that it is meant otherwise.

Upon reading this disclosure, those of skill in the art will appreciate still additional alternative structural and functional designs for selecting communication of communications apparatus through the disclosed principles herein. Thus, while particular embodiments and applications have been illustrated and described, it is to be understood that the present disclosure is not limited to the precise construction and components disclosed herein and that various modifications, changes and variations which will be apparent to those skilled in the art may be made in the arrangement, operation and details of the method and apparatus of the present disclosure disclosed herein without departing from the spirit and scope of the invention as defined in the appended claims.

APPENDIX 1

Algorithm
Procedure to calculate appropriate communication mode, P(M)

```
Start
    Input T          // Current time
    Input Today      // Current date
    Input N          // defines range of minutes either side of time T
    Input D          // recent usage history range
    Input H          // long-term usage history range
    Input CM         // range of available modes of communication for
correspondent
    Variable Recent
    Variable Average_Recent
    Variable Ratio_Recent = 0.5
    Variable History
    Variable Average_History
    Variable Ratio_History = 0.5
    Constant K as 2.0     // Weighting for use today
    Constant S as 3.0     // Weighting for contact being visible on screen
    Constant E as 3.0     // Weighting for communications expressly
indicated for a particular CM
    Array M [ size = number of modes ] of data structure { name,
score }
    For all modes CM, loop
        // recent history
        For all days past from Today to Today-D, loop
            If mode CM used in T-N ... T+N
                Add 1 to Recent
            Endif
        End loop
        Average_Recent = Recent divided by D
        If mode CM used Today
            Multiply Average_Recent by K
        Endif
        If on screen associated with mode M
            Multiply Average_Recent by S
        Endif
        If Presence Available for correspondent
            If presence associated with CM
                Multiply Average_Recent by E
            Endif
        Endif
        // long term history
        For all days past from Today to Today-D,         loop
            If mode CM used in T-N ... T+N
                Add 1 to History
            Endif
        End Loop
        Average_History = History divided by H
        If mode CM used Today
            Multiply Average_History by K
        Endif
        If on screen associated with mode M
            Multiply Average_History by S
```

-continued

```
        Endif
        If Presence Available for correspondent
            If presence associated with CM
                Multiply Average_History by E
            Endif
        Endif
        // calculate score for this mode
        Variable temp = (Average_Recent × Ratio_Recent)
              + (Average_History × Ratio_History)
        Set array M { mode, temp }
    End loop
    Sort elements of M by score, descending
    Output M
End
```

APPENDIX 2

Communications Database

| db source | day | time | event |
|---|---|---|---|
| call log | 1 | 09:20 | answered call |
| call log | 1 | 10:00 | answered call |
| call log | 1 | 15:00 | answered call |
| call log | 1 | 16:00 | answered call |
| call log | 2 | 17:00 | answered call |
| call log | 2 | 20:00 | answered call |
| call log | 2 | 15:20 | missed call |
| call log | 2 | 11:00 | missed call |
| call log | 3 | 18:00 | missed call |
| call log | 3 | 10:00 | received call |
| call log | 4 | 11:00 | received call |
| call log | 4 | 18:00 | received call |
| email | 1 | 15:00 | received email |
| email | 1 | 16:00 | received email |
| email | 2 | 17:00 | received email |
| email | 2 | 19:00 | received email |
| email | 3 | 11:00 | received email |
| email | 3 | 13:00 | received email |
| email | 4 | 14:00 | received email |
| sms | 1 | 09:00 | received sms |
| sms | 1 | 10:00 | received sms |
| sms | 1 | 10:10 | received sms |
| sms | 2 | 20:20 | received sms |
| sms | 2 | 20:30 | received sms |
| sms | 2 | 20:40 | received sms |
| sms | 4 | 20:30 | received sms |
| sms | 4 | 20:35 | received sms |
| recent ptt history | 1 | 0200-0800 | not available |
| recent ptt history | 1 | 0800-1400 | available |
| recent ptt history | 1 | 1400-2000 | available |
| recent ptt history | 1 | 2000-0200 | not available |
| recent ptt history | 2 | 0200-0800 | not available |
| recent ptt history | 2 | 0800-1400 | available |
| recent ptt history | 2 | 1400-2000 | available |
| recent ptt history | 2 | 2000-0200 | not available |
| recent ptt history | 3 | 0200-0800 | not available |
| recent ptt history | 3 | 0800-1400 | not available |
| recent ptt history | 3 | 1400-2000 | available |
| recent ptt history | 3 | 2000-0200 | not available |
| recent ptt history | 4 | 0200-0800 | not available |
| recent ptt history | 4 | 0800-1400 | not available |
| recent ptt history | 4 | 1400-2000 | available |
| recent ptt history | 4 | 2000-0200 | available |
| current presence | 5 | NOW | available |

What is claimed is:

1. A communications device comprising:
a mode comparator configured to determine which one of a plurality of available communication modes is likely to be most appropriate for selection when initiating communication with a destination call party based at least in part on availability status data representative of a state of availability of the destination call party, the mode comparator being further configured to generate an ordered list of the plurality of available communication modes for presentation to a user in which the communication mode determined to be most appropriate is a first ranked mode of the ordered list, and wherein a ranking of the available communication modes in the ordered list is representative of the likelihood of use of respective communication modes in communicating with the destination call party;

a contact identifier module adapted to extract from currently viewed display data a contact identifier identifying the destination call party and adapted to acquire corresponding contact address information for use in each of the available communication modes; and a historical data module adapted to analyze a history of previously made communications using the contact address information and adapted to derive for each available communication mode a score value representative of a number of instances of communication made during at least one time period, said score value being input to the mode comparator for use in determining the ranking of the available communication modes in the ordered list for presentation to the user.

2. A communications device comprising:

a mode comparator configured to (i) determine which one of a plurality of available communication modes is likely to be most appropriate for selection when initiating communication with a destination call party based at least in part on availability status data representative of a state of availability of the destination call party, and (ii) generate an ordered list of the plurality of available communication modes for presentation to a user in which the communication mode determined to be most appropriate is a first ranked mode of the ordered list, wherein a ranking of the available communication modes in the ordered list is representative of the likelihood of use of respective communication modes in communicating with the destination call party.

3. The communications device of claim 2, further comprising:

a contact identifier module adapted to extract from currently viewed display data a contact identifier identifying the destination call party and adapted to acquire corresponding contact address information for use in each of the available communication modes.

4. The communications device of claim 3, further comprising:

a historical data module adapted to analyze a history of previously made communications using the contact address information and adapted to derive for each available communication mode a score value representative of the number of instances of communication made during at least one time period, said score value being input to the mode comparator for use in determining the ranking of the available communication modes in the ordered list for presentation to the user.

5. The communications device of claim 4, wherein the mode comparator is further configured to generate the ordered list by determining a set of weighting factors for respective available communication modes, and wherein determining the set of weighting factors comprises:

associating with each of the available communication modes a respective imposition value representative of a degree to which communication with the destination call party via said communication mode is judged to be intrusive;

deriving from the availability status data a presence value representative of a degree to which the destination call party is judged to be receptive to intrusion using a comparable numerical range to that of the imposition values; and determining, from a correlation of the presence value and imposition values, an availability based order of ranking of the available communication modes.

6. The communications device of claim 5, wherein the mode comparator is further configured to generate the ordered list by multiplying the score value for each available communication mode by its respective weighting factor to obtain weighted scores, the set of weighting factors being graded according to rank in the availability status based ranking order such that a first mode receives a maximum weighting factor and the remaining communication modes, in order of rank, receive progressively smaller weighting factors.

7. The communications device of claim 6, wherein the mode comparator is further configured to determine the ordered list for presentation to the user by ranking the communication modes in order of the weighted scores such that the first ranking mode in the ordered list for presentation has the highest weighted score.

8. The communications device of claim 6, wherein the mode comparator is further configured to determine the ordered list by determining that the ranking of the available communication modes in the ordered list is in the same order as the ranking of the available communication modes in the availability based order of ranking.

9. The communications device of claim 2, further comprising a display, and wherein the display presents the ordered list generated by the mode comparator.

10. The communications device of claim 5, wherein determining the availability based order of ranking of the available communication modes comprises:

correlating the presence value and imposition values by computing for each available communication mode a distance between the presence value and imposition value;

determining at least one mode in the availability based order of ranking on the basis of least distance and determine the order of ranking of remaining communication modes in order of increasing imposition value.

11. A method of operating a communications device, the method being performed by one or more processors and comprising:

determining which one of a plurality of available communication modes is likely to be most appropriate for selection when initiating communication with a destination call party based at least in part on availability status data representative of a state of availability of the destination call party; and generating an ordered list of the plurality of available communication modes for presentation to a user in which the communication mode determined to be most appropriate is a first ranked mode of the ordered list, wherein a ranking of the available communication modes in the ordered list is representative of the likelihood of use of respective communication modes in communicating with the destination call party.

12. The method of claim 11, further comprising:

extracting from currently viewed display data a contact identifier identifying the destination call party; and acquiring corresponding contact address information for use in each of the available communication modes.

13. The method of claim 12, further comprising:
analyzing a history of previously made communications using the contact address information; and
deriving for each available communication mode a score value representative of the number of instances of communication made during at least one time period, said score value being input to the mode comparator for use in determining the ranking of the available communication modes in the ordered list for presentation to the user.

14. The method of claim 13, wherein generating the ordered list comprises determining a set of weighting factors for respective available communication modes, and wherein determining the set of weighting factors comprises:
associating with each of the available communication modes a respective imposition value representative of a degree to which communication with the destination call party via said communication mode is judged to be intrusive;
deriving from the availability status data a presence value representative of a degree to which the destination call party is judged to be using a comparable numerical range to that of the imposition values; and
determining, from a correlation of the presence value and imposition values, an availability based order of ranking of the available communication modes.

15. The method of claim 14, wherein generating the ordered list comprises multiplying the score value for each communication mode by its respective weighting factor to obtain weighted scores, the weighting factors being graded according to rank in the availability status based ranking order such that a first mode receives a maximum weighting factor and the remaining communication modes in order of rank receive progressively smaller weighting factors.

16. The method of claim 15, wherein generating the ordered list comprises ranking the communication modes in order of the weighted scores such that the first ranking mode in the ordered list for presentation has the highest weighted score.

17. The method of claim 15, wherein generating the ordered list comprises determining that the ranking of the available communication modes in the ordered list is in the same order as the ranking of the available communication modes in the availability based order of ranking.

18. The method of claim 12, further comprising:
displaying the ordered list for presentation to the user, displaying as a suggested mode of communication the first ranking mode in the ordered list for presentation, and displaying a presence indicator representative of the availability status data.

19. A method of claim 14, wherein determining the availability based order of ranking of the available communication modes comprises:
correlating the presence value and imposition values by computing for each available communication mode a distance between the presence value and imposition value;
determining at least one mode in the availability based order of ranking on the basis of least distance and determines the order of ranking of remaining communication modes in order of increasing imposition value.

20. A computer program product comprising a non-transitory computer-readable storage medium to store instructions executable by a processor, the instructions when executed, causing the processor to:
select one communication mode from a plurality of available communication modes, the selected communication mode determined appropriate for communicating with a destination call party based at least in part on availability status data indicating whether the destination call party is available; and
generate an ordered list of the plurality of available communication modes for presentation to a user in which the selected communication mode determined to be most appropriate is a first ranked mode of the ordered list, wherein a ranking of the available communication modes in the ordered list is representative of the likelihood of use of respective communication modes in communicating with the destination call party.

* * * * *